US008149708B2

(12) United States Patent
Oz et al.

(10) Patent No.: US 8,149,708 B2
(45) Date of Patent: Apr. 3, 2012

(54) DYNAMICALLY SWITCHING STREAMS OF PACKETS AMONG DEDICATED AND SHARED QUEUES

(75) Inventors: Doron Oz, Even Yehuda (IL); Earl T. Cohen, Oakland, CA (US); Eyal Oren, Raanana (IL)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 11/407,805

(22) Filed: Apr. 20, 2006

(65) Prior Publication Data

US 2007/0248110 A1 Oct. 25, 2007

(51) Int. Cl.
*G01R 31/08* (2006.01)
*H04L 12/28* (2006.01)

(52) U.S. Cl. ........................................ 370/235; 370/412
(58) Field of Classification Search ................... 370/412
See application file for complete search history.

(56) References Cited

U.S. PATENT DOCUMENTS

| 6,262,974 | B1 | 7/2001 | Chevalier et al. | |
|---|---|---|---|---|
| 7,082,132 | B1 * | 7/2006 | Beshai et al. | 370/391 |
| 2002/0116521 | A1 | 8/2002 | Paul et al. | |
| 2003/0076849 | A1 * | 4/2003 | Morgan et al. | 370/412 |
| 2003/0118029 | A1 | 6/2003 | Maher, III et al. | |
| 2003/0161284 | A1 * | 8/2003 | Chen | 370/331 |
| 2003/0223442 | A1 * | 12/2003 | Huang et al. | 370/412 |
| 2004/0001579 | A1 * | 1/2004 | Feinberg et al. | 379/156 |
| 2004/0081197 | A1 * | 4/2004 | Liu | 370/468 |
| 2004/0114583 | A1 * | 6/2004 | Cetin et al. | 370/360 |
| 2004/0120502 | A1 * | 6/2004 | Strathmeyer et al. | 379/265.01 |
| 2004/0240453 | A1 * | 12/2004 | Ikeda et al. | 370/395.21 |
| 2005/0201398 | A1 * | 9/2005 | Naik et al. | 370/412 |
| 2005/0240649 | A1 * | 10/2005 | Elkington et al. | 709/200 |
| 2006/0168302 | A1 * | 7/2006 | Boskovic et al. | 709/231 |
| 2006/0203719 | A1 * | 9/2006 | Kim et al. | 370/227 |
| 2007/0061433 | A1 | 3/2007 | Reynolds et al. | |
| 2007/0195792 | A1 * | 8/2007 | Chen et al. | 370/395.52 |

OTHER PUBLICATIONS

Bernet et al., "An Informal Management Model for Diffserv Routers," RFC 3290, The Internet Society, May 2002, 56 pages.

* cited by examiner

*Primary Examiner* — John Blanton
(74) *Attorney, Agent, or Firm* — The Law Office of Kirt D. Williams (57) ABSTRACT

Streams of packets are dynamically switched among dedicated and shared queues. For example, when a packet stream is in a maintenance mode (such as to keep a tunnel or packet stream associated with a server active) all packet traffic received over a packet stream is directed into the shared queue while the packet stream is not associated with one of the dedicated queues. In response to a detected change in the packet activity status of packet traffic (e.g., the establishment of a call or an increase in packet traffic, especially desirous of individualized quality of service) over a particular packet stream of the packet streams, the particular packet stream is associated with a particular group of dedicated queues such that at least non-control data traffic received over the particular packet stream is subsequently directed into the particular group of dedicated queues while the particular packet stream remains associated with the particular group of dedicated queues.

48 Claims, 5 Drawing Sheets

DYNAMICALLY SWITCHING STREAMS OF PACKETS AMONG DEDICATED AND SHARED QUEUES

TECHNICAL FIELD

One embodiment of the invention relates to communications and computer systems, especially routers, packet switching systems, and other devices; and more particularly, one embodiment relates to the dynamic assignment of packet streams to dedicated and shared queues, which may be performed to accommodate changes in service activity levels in the streams of packets, such as in, but not limited to, a fixed mobile convergence environment.

BACKGROUND

The communications industry is rapidly changing to adjust to emerging technologies and ever increasing consumer demand. This consumer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Consumers and designers of these systems typically desire high reliability and may wish to provide communications services with a guaranteed quality of service. Although packet communications systems are very complex, they are typically built around the basic concept of receiving packets and placing them in appropriate input queues, switching and processing of these packets and placing them in appropriate output queues, then sending the packets from these output queues. Although simple in concept, the details of how to queue and schedule individual systems can be quite complex and is a subject of many research and development efforts.

For example, if all received packets are placed in a single queue (FIFO), then a packet cannot be removed from the queue until all other packets ahead of it are removed from the queue, which can impose a head-of-line blocking problem. This concept is easily demonstrated in the context of a grocery store: if all consumers must use a single checkout register, then a person with one item may have to wait in line (i.e., wait in the queue) behind a person with a large number of items and not be able to check out until all of these large number of items are processed. Thus, express lanes are provided in many grocery stores so that a class of consumers (e.g., those with a few items, i.e., that only requires minimal processing) will not have to wait behind other classes of consumers (e.g., those with a large number of items that requires substantial processing). Similarly, many communications systems provide multiple priorities of packet traffic, wherein received packets are classified and placed in queues corresponding to their classification. The packets are then removed from the queues based on one of an unlimited number of scheduling methodologies.

The grocery store example also demonstrates another queuing problem, which is that one consumer is affected by other consumers (e.g., consumers wait in line for their turns behind other consumers). Similarly, this variant of the queuing problem occurs when packets of multiple packet streams, often belonging to different consumers, are placed in a same queue. The latency delay of a particular packet belonging to a stream/consumer will be affected by the latency delay of other stream/consumer's packets ahead of the particular packet in a queue.

Therefore, many communications systems that receive packets from multiple subscribers will provide each subscriber with its own groups of input queues and output queues, with each group including one or more queues often differentiated by an associated class of service. This approach does not scale well. For example, if a communications systems has one million active subscribers and each of these subscribers requires two classifications of packet traffic (e.g., a high and low priority), then four million queues will be required (i.e., two million queues for the ingress traffic and two million queues for egress traffic). Thus, this approach can require substantial resources.

Systems can be capable of dynamically creating or assigning groups of queues to packet traffic when a packet stream becomes active (i.e., when there is a least one packet's worth of traffic being communicated); such a system would be designed with the belief that a predetermined number of its subscribers will not be sending any traffic at any given time in order to avoid implementing a system with a full contingent of queuing resources. In other words, the system would be designed with over-subscribed queues in that there are not enough queues for all potentially active devices.

However, this over-subscription of queues approach does not completely address nor solve a scalability problem for systems in which has a large number of concurrent active subscribers, such as in the fixed mobile convergence (FMC) environment, which typically uses a virtual private network (VPN) gateway terminating Internet Protocol Security (IPSec) tunnels from dual-mode cellular/WIFI devices (e.g., including phones). A substantial portion of these devices and their corresponding tunnels are typically active at all times, as a device continuously sends control, keep-alive, and/or data packets whether or not a voice conversation or data communication session exists, in order to keep the tunnel open and the device accessible from the network device (e.g., so the device can receive calls). Thus, unless the device is turned completely off, it is actively sending packets, and therefore, current approaches require each device to have its own group of queues in order to be able to schedule on a basis of per subscriber and per subscriber/class. As it is not unforeseeable to have hundreds of thousands or millions of active consumers at a time, such a network device requires substantial queuing resources.

Figure 1:
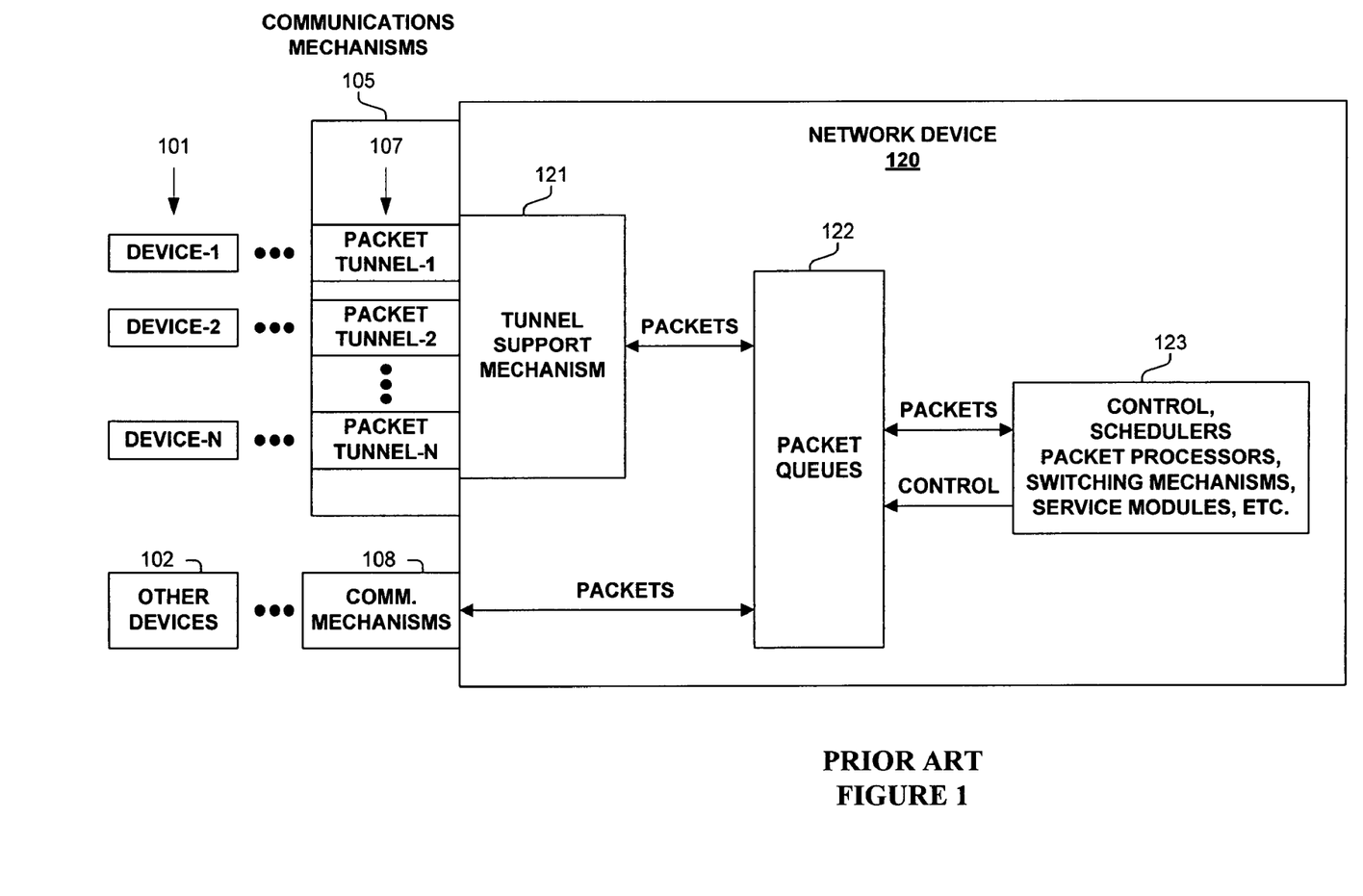
FIG. 1 is a block diagram of a prior art network configuration.

FIG. 1 illustrates such an example prior art FMC environment in which devices 101 communicate via tunnels 107 provided by communication mechanism(s) 105 to network device 120. Network device 120 also communicates with other devices 102 (e.g., routers, other network and consumer devices, etc.) via communications mechanism(s) 108. Tunnel support mechanism 121 terminates packet tunnels 121, including enqueuing and dequeuing packets with packet queues 122, which are also accessed by network device functions 123 (e.g., control, schedulers, packet processors, switching mechanisms, service modules, etc.). Packet queues 122 include one queue per group of subscribers. Therefore, in order to support a large number of subscribers, packet queues 122 represent a substantial number of queues and resources therein to implement these queues. Also, as queues are currently shared among multiple subscribers, QoS at the individual subscriber level is typically not provided.

SUMMARY

Disclosed are, inter alia, methods, apparatus, data structures, computer-readable media, mechanisms, and means for dynamically switching streams of packets among dedicated and shared queues. One embodiment associates packet streams with one or more shared queues, such that all packet traffic received over a packet stream is directed into the shared queues while the packet stream is not associated with one of the dedicated queues. In response to a detected change in the packet activity status of packet traffic (e.g., the establishment of a call or an increase in packet traffic, especially desirous of individualized quality of service) over a particular packet stream, the particular packet stream is associated with a particular group of dedicated queues such that at least non-control data traffic received over the particular packet stream is subsequently directed into the particular group of dedicated queues while the particular packet stream remains associated with the particular group of dedicated queues. These received packets are removed from the shared and dedicated queues, and then processed or forwarded. In response to a second detected change in the packet activity status of packet traffic (e.g., the termination of a call or a decrease in packet traffic, especially that not in need of individualized quality of service) over a particular packet stream, the particular packet stream is again associated with the one or more shared queues.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, mechanisms, and means for dynamically switching streams of packets among dedicated and shared queues, which may be performed to accommodate changes in service activity levels of these streams of packets, such as in, but not limited to, a fixed mobile convergence environment.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, frames, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device broadly refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface), or even a "port" as commonly used in bridging terminology.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for dynamically switching streams of packets among dedicated and shared queues, which may be performed to accommodate changes in service activity levels of these streams of packets, such as in, but not limited to, a fixed mobile convergence (FMC) environment. For example, in an FMC environment, the number of active tunnels is typically orders of magnitude greater than the number of actual voice or data calls in current use. However, in order to maintain these tunnels with end user devices, as well as to maintain connections between the end user devices and servers (e.g., call servers, etc.), a small amount of traffic must be constantly transmitted over these tunnels. Thus, it is possible to share one or more queues for this type of tunnel/server connection maintenance traffic (e.g., keep alives and other control messages), and then, upon commencement of a higher level of activity (e.g., the establishment of a call) to switch the tunnel/packet stream to a group of dedicated queues in order to be able to provide individualized QoS. In response to another change in call activity status (e.g., the termination of a call), the dedicated group of queues can be freed, and the tunnel/packet stream switched to use the one or more shared queues.

In one embodiment, a tunnel/packet stream may be associated with a class of service, and in which case, the group of dedicated queues dynamically assigned to such tunnel/packet stream will have a matching class of service. In order to avoid a miss-ordering of the forwarding of packets, when a transition is made between the shared to the dedicated queues in one embodiment, traffic belonging to the tunnel/packet stream is flushed from the one or more shared queues before any packets are dequeued from the dynamically assigned dedicated group of queues. The identification of when the flushing has occurred can occur in many ways, such as, but not limited to, enqueuing a control or meta-packet in each of the one or more shared queues indicating the dynamically assigned tunnel/packet stream and/or group of dedicated queues, such that, when the control or meta-packet is dequeued, this flushing has occurred and packets can begin to be served from the group of dedicated queues. Many other ways can be used in an embodiment to detect this flushing, such as using packet counters, waiting a maximum delay amount, or by using timestamps. In one embodiment, the ordering of these packets is not important, and thus this flushing operation is not enforced.

One embodiment associates packet streams with one or more shared queues, such that all packet traffic received over a packet stream is directed into the shared queues while the packet stream is not associated with one of the dedicated queues. In response to a detected change in the packet activity status of packet traffic (e.g., the establishment of a call or an increase in packet traffic, especially desirous of individualized quality of service) over a particular packet stream, the particular packet stream is associated with a particular group of dedicated queues such that at least non-control data traffic received over the particular packet stream is subsequently directed into the particular group of dedicated queues while the particular packet stream remains associated with the particular group of dedicated queues. These received packets are removed from the shared and dedicated queues, and then processed or forwarded. In response to a second detected change in the packet activity status of packet traffic (e.g., the termination of a call or a decrease in packet traffic, especially that not in need of individualized quality of service) over a particular packet stream, the particular packet stream is again associated with the one or more shared queues.

One embodiment includes a device configured to dynamically switch queues associated with packet streams, with the device including a shared queue group of one or more shared queues and a plurality of groups of dedicated queues of one or more dedicated queues. A plurality of packet streams is associated with the shared queue group, such that all packet traffic received over a packet stream of the plurality of packet streams is enqueued into the shared queue group while said packet stream is not associated with one of said groups of dedicated queues. In response to a detected change in the packet activity status of packet traffic over a particular packet stream of said packet streams, the particular packet stream is associated with a particular group of dedicated queues of said groups of dedicated queues such that at least non-control data traffic received over the particular packet stream is subsequently enqueued into the particular group of dedicated queues while the particular packet stream remains associated with the particular group of dedicated queues. These packets are dequeued from said shared queue group and the particular group of dedicated queues and processed and/or forwarded.

One embodiment also, in response to a second detected change in the packet activity subsequent to said association of the particular packet stream with the particular group of dedicated queues, removes the association of the particular packet stream with the particular group of dedicated queues such that packet traffic received over the particular packet stream is subsequently enqueued into the shared queue group until another detected change in the packet activity status of packet traffic of the particular packet stream is detected. In one embodiment, the detected change corresponds to the commencement of a voice call; and the second detected change corresponds to the end of the voice call. In one embodiment, the detected change corresponds to the commencement of a data call; and the second detected change corresponds to the end of the data call. In one embodiment, said at least non-control data traffic received over the particular packet stream includes all traffic received over the particular packet stream. In one embodiment, at least one packet received over the particular packet stream resides in the shared queue subsequent to said association of the particular packet stream with the particular group of dedicated queues and prior to said removing the association of the particular packet stream with the particular group of dedicated queues; and wherein said removing and processing or forwarding of said received packets includes: subsequent to said association of the particular packet stream with the particular group of dedicated queues and prior to said removing the association of the particular packet stream with the particular group of dedicated queues, ensuring all packets received from over the particular packet stream are removed from the shared queue group prior to removing said received packets received over the particular packet stream from the particular group of dedicated queues.

In one embodiment, each of said packet streams corresponds to a different packet tunnel. In one embodiment, said detected change in the packet activity status corresponds to a change in a type of traffic to be associated with a quality of service specific to the particular packet stream. In one embodiment, said type of traffic to be associated with quality of service specific to the particular packet stream includes an active voice call. In one embodiment, said type of traffic to be associated with quality of service specific to the particular packet stream includes an active data call.

In one embodiment, the number of packet streams in the plurality of packet streams is greater than the number of groups in the plurality of groups of dedicated queues. In one embodiment, the number of packet streams in the plurality of packet streams is greater than the number of groups in the plurality of groups of dedicated queues by at least an order of magnitude. In one embodiment, each of said groups of the plurality of groups of dedicated queues includes at least two queues. In one embodiment, the plurality of packet streams includes at least three packet streams. In one embodiment, said shared queue group includes at least two shared queues. In one embodiment, said shared queue group includes at most one shared queue. In one embodiment, the detected change is identified based on an inspection of a particular packet or a particular stream of packets received on the particular packet stream. In one embodiment, the detected change is identified based on one or more received packets containing call control information for initializing a voice or data call over the particular packet stream. In one embodiment, the detected change is identified based on an increased rate of traffic received over the particular packet stream.

In one embodiment, each of the packet streams is associated with a level of service of a plurality of levels of service and each of the plurality of groups of dedicated queues is associated with a level of service of a plurality of levels of service, and wherein the particular group of dedicated queues is selected from the plurality of groups of dedicated queues in order to match its said level of service with said level of service of the particular packet stream.

In one embodiment, no packets containing data of a voice or data call are enqueued into a shared queue of the group of shared queues. In one embodiment, each of said packet streams corresponds to a packet tunnel. In one embodiment, said change in the packet activity is a change in a characterization of the type of traffic currently being received over the particular packet stream from a mode to keep said tunnel associated with the packet stream active to a mode of increased voice or data traffic over the particular packet stream. In one embodiment, in response to a second detected change in the packet activity subsequent to said association of the particular packet stream with the particular group of dedicated queues, the association of the particular packet stream with the particular group of dedicated queues is removed such that packet traffic received over the particular packet stream is subsequently enqueued into a shared queue of the shared queue group until another detected change in the packet activity status of packet traffic of the particular packet stream is detected; wherein said second detected change in the packet activity is a change in a characterization of the type of traffic currently being received over said tunnel associated with the particular packet stream from a mode of communicating voice or data traffic to a keep said tunnel associated with the packet stream active. In one embodiment, each of the plurality of plurality of packet streams use said shared queue group of shared queues to maintain tunnels associated with said packet streams or associations between end devices with one or more call servers; and wherein the number of packet streams in the plurality of packet streams is greater than the number of groups in the plurality of groups of dedicated queues.

In one embodiment, the particular packet stream includes a first sub-stream of packets and a second sub-stream of packets, and the particular group of dedicated queues includes a first dedicated queue and a second dedicated queue; and wherein the first sub-stream is enqueued into the first dedicated queue and the second sub-stream is enqueued into the second dedicated queue. In one embodiment, the first dedicated queue is serviced at a higher priority servicing rate than the second dedicated queue. In one embodiment, said forwarding of said received packets from said shared queue group and the particular group of dedicated queues includes forwarding packets from both said shared queue group and the particular group of dedicated queues over a same communications connection or packet tunnel.

One embodiment includes a device configured to dynamically switch queues associated with packet tunnels, with the device including one or more shared queues and a plurality of groups of dedicated queues. A plurality of packet tunnels are associated with said one or more shared queues such that all packet traffic sent over a packet tunnel of the plurality of packet tunnels is dequeued from said one or more shared queues while said packet tunnel is not associated with one of the dedicated queues. In response to a detected change in the packet activity status of packet traffic to be sent over a particular packet tunnel of said packet tunnels, the particular packet tunnel is associated with a particular group of dedicated queues of said groups of dedicated queues such that at least non-control data traffic sent over the particular tunnel is subsequently dequeued from the particular group of dedicated queues while the particular packet tunnel remains associated with the particular group of dedicated queues. Packets are removed from said shared and dedicated queues, with these packets being processed and/or forwarded.

In one embodiment, in response to a second detected change in the packet activity subsequent to said association of the particular packet tunnel with the particular group of dedicated queues, the association of the particular packet tunnel with the particular group of dedicated queues is removed such that packet traffic sent over the particular tunnel is subsequently dequeued from said one or more shared queues until another detected change in the packet activity status of packet traffic of the particular packet tunnel is detected. In one embodiment, the detected change corresponds to the commencement of a voice call; and the second detected change corresponds to the end of the voice call. In one embodiment, the detected change corresponds to the commencement of a data call; and the second detected change corresponds to the end of the data call.

One embodiment includes: a group of shared queues; a plurality of groups of dedicated queues; a mechanism configured to maintain associations of a plurality of packet streams with groups of said shared and dedicated queues; a mechanism configured to detect changes in packet activity status in packet streams of the plurality of packet streams and to update said associations of packet streams with said groups of said shared and dedicated queues such that packet streams with a packet activity status of being in a maintenance mode are associated with and use the group of shared queues, while packet streams with a packet activity status of a high-level of activity mode are associated with and use groups of the plurality of groups of dedicated queues; a mechanism configured to receive packets of said packet streams and for enqueuing said packets in said groups of said shared and dedicated queues according to said associations of packet streams with said groups of said shared and dedicated queues; and a mechanism configure to dequeue packets from said shared and dedicated queues and to forward or process said dequeued packets.

In one embodiment, the number of packet streams is larger than the number of groups in the set comprising the group of shared queues and the plurality of groups of dedicated queues. In one embodiment, the number of packet streams is at least an order of magnitude larger than the number of groups in the set comprising the group of shared queues and the plurality of groups of dedicated queues. In one embodiment, said packet streams are between user devices and one or more voice call servers. In one embodiment, the high-level of activity mode corresponds to a voice call being conducted between a user device of said user devices and a voice call server of said voice call servers. In one embodiment, each of said packet streams corresponds to a different packet tunnel.

One embodiment includes: a group of shared queues; a plurality of groups of dedicated queues; means for maintaining associations of a plurality of packet streams with groups of said shared and dedicated queues; means for detecting changes in packet activity status in packet streams of the plurality of packet streams and for updating said associations of packet streams with said groups of said shared and dedicated queues such that packet streams with a packet activity status of being in a maintenance mode are associated with and use the group of shared queues, while packet streams with a packet activity status of a high-level of activity mode are associated with and use groups of the plurality of groups of dedicated queues; means for enqueuing said packets in said groups of said shared and dedicated queues according to said associations of packet streams with said groups of said shared and dedicated queues; and means for dequeuing packets from said shared and dedicated queues and for forwarding or processing said dequeued packets.

In one embodiment, the number of packet streams is larger than the number of groups in the set comprising the group of shared queues and the plurality of groups of dedicated queues. In one embodiment, the number of packet streams is at least an order of magnitude larger than the number of groups in the set comprising the group of shared queues and the plurality of groups of dedicated queues. In one embodiment, each of said packet streams corresponds to a different packet tunnel.

Figure 2A:
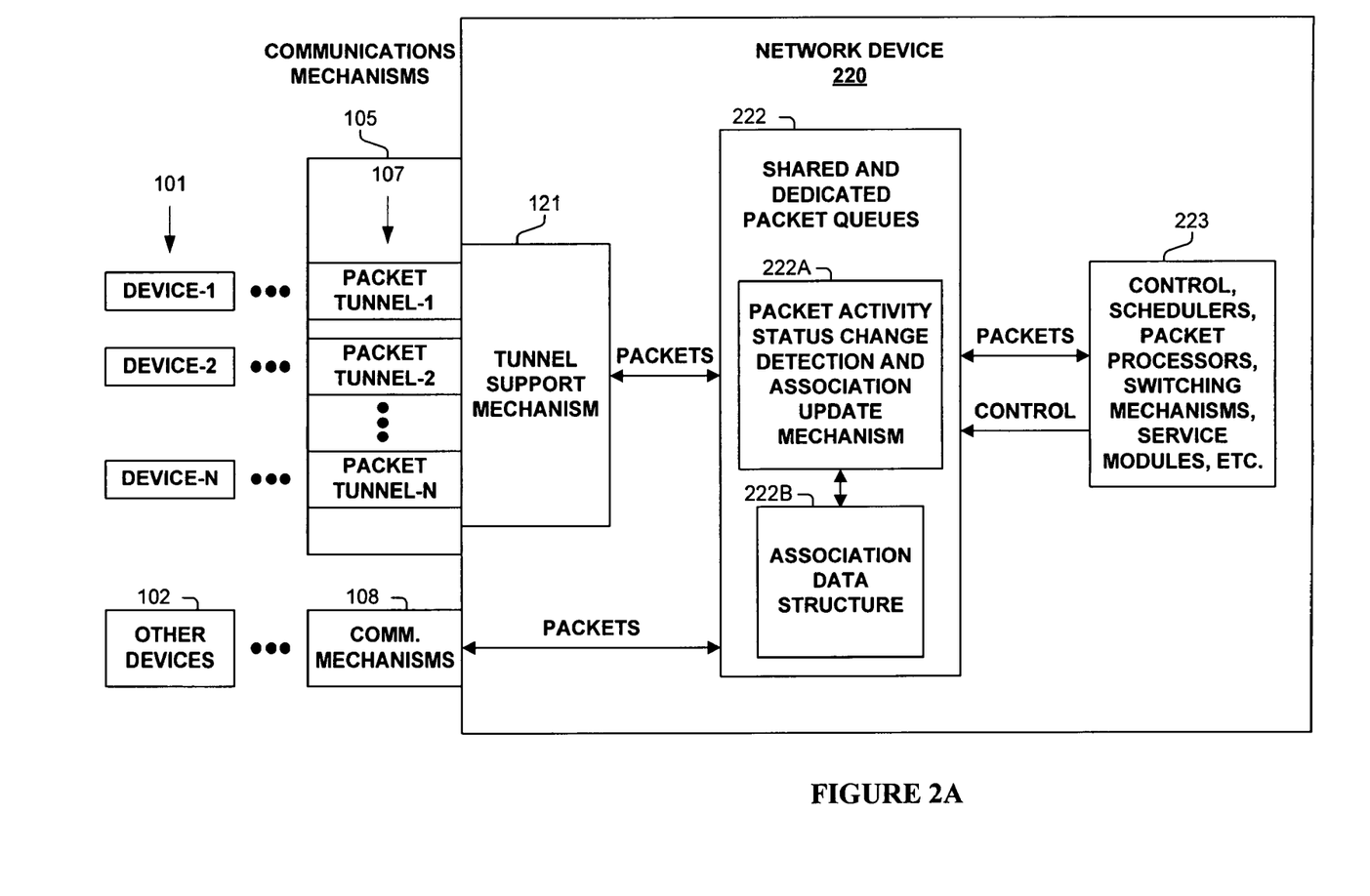
FIG. 2A is a block diagram illustrating a network configuration including a device configured to dynamically switch streams of packets among dedicated and shared queues as performed in one embodiment.

Turning to the figures, FIG. 2A is a block diagram illustrating a network configuration including a device 220 configured to dynamically switch streams of packets among dedicated and shared queues as performed in one embodiment. FIG. 2A is similar to that of FIG. 1, but with the dynamic switching of queues capability added. In one embodiment, the mechanism for maintaining the queues 222 is modified from previous implementations to add the packet activity change detection functionality (222A) and an association data structure (222B) to maintain the associations between tunnels/packet streams and an identification of a shared or dedicated group of queues. Association data structure 222B is maintained by packet activity status change detection and association update mechanism 222A. Also, device functions 223 is correspondingly updated to accommodate the dynamic switching between shared and dedicated queues.

In one embodiment, a change in packet activity status is detected based on the contents of a packet (e.g., a call setup or tear down message), a change in a measured amount of traffic (e.g., a change in traffic level to above or below a tunnel/connection maintenance level), or even a recognition of an identification of such a change provided by another component of an embodiment.

Figure 2B:
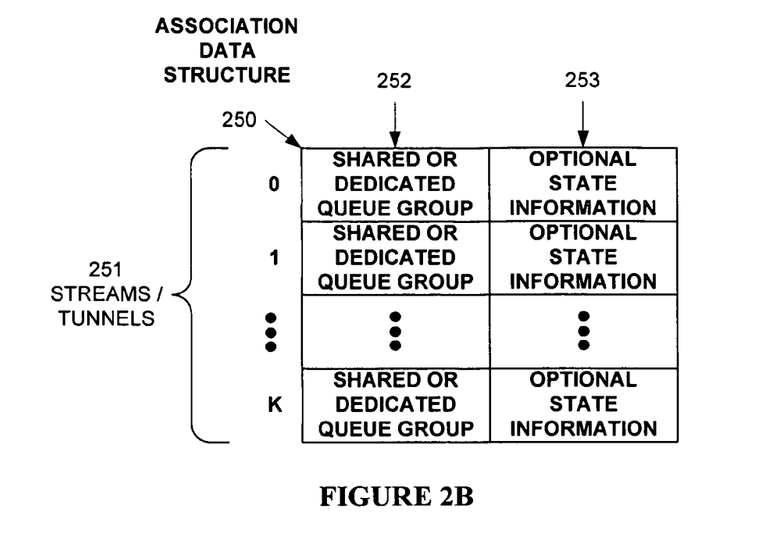
FIG. 2B is a data structure used in one embodiment.

FIG. 2B is a data structure 250 used in one embodiment to maintain for each tunnel/packet stream 251, an identifier 252 of the shared or dedicated queue group assigned to it. In one embodiment, association data structure 250 also includes a field 253 for storing state information useful for detecting changes in packet activity status (e.g., packet counts for determining packet rates) and/or other state information.

Figure 3:
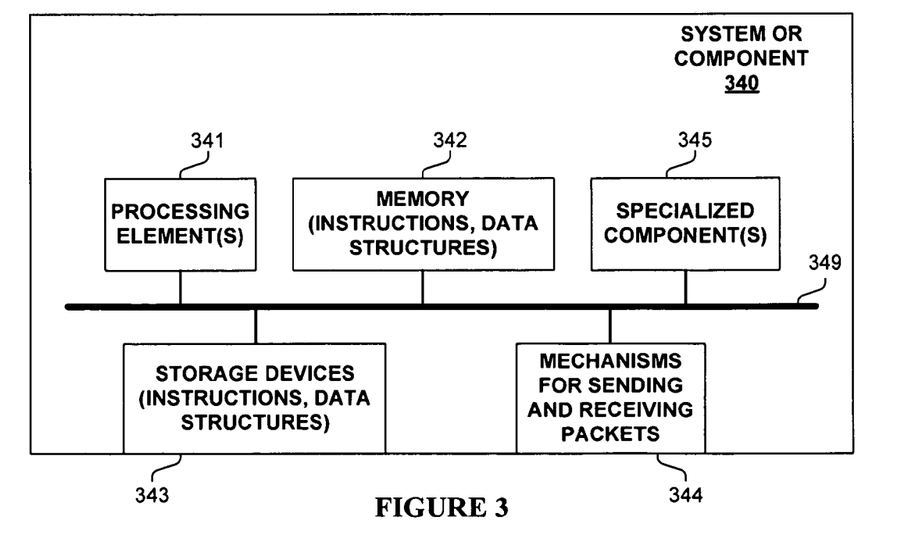
FIG. 3 is a block diagram illustrating a device or component configured to dynamically switch streams of packets among dedicated and shared queues as performed in one embodiment.

FIG. 3 is block diagram of a system or component 340 configured to dynamically switch streams of packets among dedicated and shared queues as performed in one embodiment. In one embodiment, system or component 340 performs one or more processes corresponding to one of the flow diagrams and/or store one or more of the data structures illustrated or otherwise described herein.

In one embodiment, system or component 340 includes one or more processing elements 341, memory 342, storage devices 343, mechanisms for sending and receiving packets 344, and specialized components 345 (e.g., ternary or binary content-addressable memories used for packet classification in order to identify a change in packet activity status and/or identify to which traffic class a packet belongs, etc.), which are typically communicatively coupled via one or more communications mechanisms 349, with the communications paths typically tailored to meet the needs of the application.

Various embodiments of component 340 may include more or less elements. The operation of component 340 is typically controlled by processing element 341 using memory 342 and storage devices 343 to perform one or more tasks or processes. Memory 342 is one type of computer-readable medium, and typically comprises random access memory (RAM), read only memory (ROM), flash memory, integrated circuits, and/or other memory components. Memory 342 typically stores computer-executable instructions to be executed by processing element 341 and/or data which is manipulated by processing element 341 for implementing functionality in accordance with an embodiment. Storage devices 343 are another type of computer-readable medium, and typically comprise solid state storage media, disk drives, diskettes, networked services, tape drives, and other storage devices. Storage devices 343 typically store computer-executable instructions to be executed by processing element 341 and/or data which is manipulated by processing element 341 for implementing functionality in accordance with an embodiment.

Figure 4:
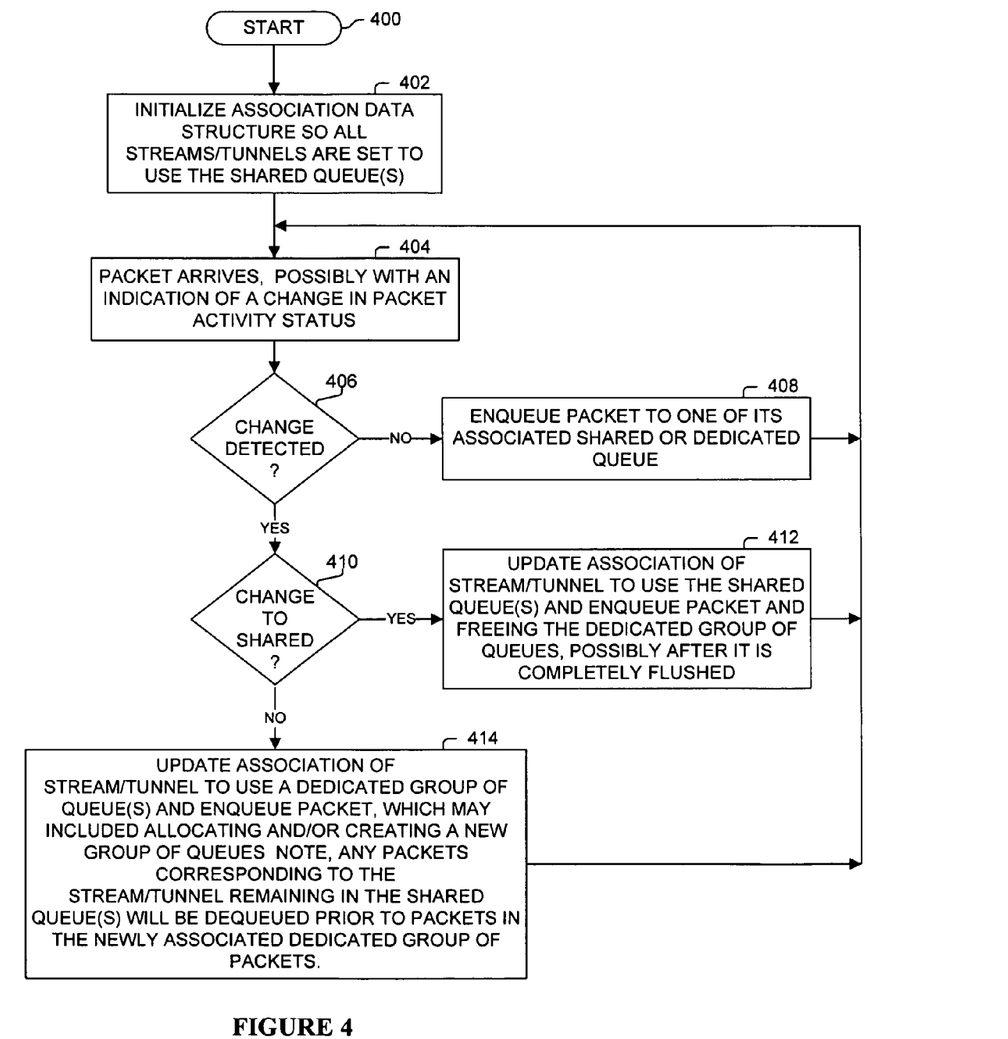
FIG. 4 is flow diagram illustrating a process used in one embodiment that dynamically switches streams of packets among dedicated and shared queues.

FIG. 4 is flow diagram illustrating a process used in one embodiment that dynamically switches streams of packets among dedicated and shared queues. Processing begins with process block 400, and proceeds to process block 402, wherein the association data structure is initialized so that all tunnels/packet streams are set to use the one or more shared queues. In process block 406, a packet arrives, possibly with an indication of a change in packet activity status. As determined in process block 406, if there is not a change in packet activity status (either per the indication or detected as discussed herein), then, in process block 408, the packet is enqueued to is associated shared or dedicated queue group. Otherwise, if there is a change such that the one or more shared queues should be used, then in process block 412, the association for the tunnel/packet stream is updated to reflect the change to use the shared queue(s), the packet is enqueued in the one or more shared queues. Also in process block 412, the dedicated group of queues (previously used for this tunnel/stream until this change) is freed (made available for other uses), possibly after waiting for all packets to be flushed from the dedicated group of queues. Otherwise, in process block 414, a dedicated group of queues for this tunnel/stream is allocated and/or created, and the association of the tunnel/packet stream is updated to use the dedicated group of queue(s), with the packet being enqueued therein. In one embodiment, any packets corresponding to the tunnel/packet stream remaining in the one or more shared queues will be dequeued prior to packets in the newly associated dedicated group of packets. Processing returns to process block 400.

Figure 5:
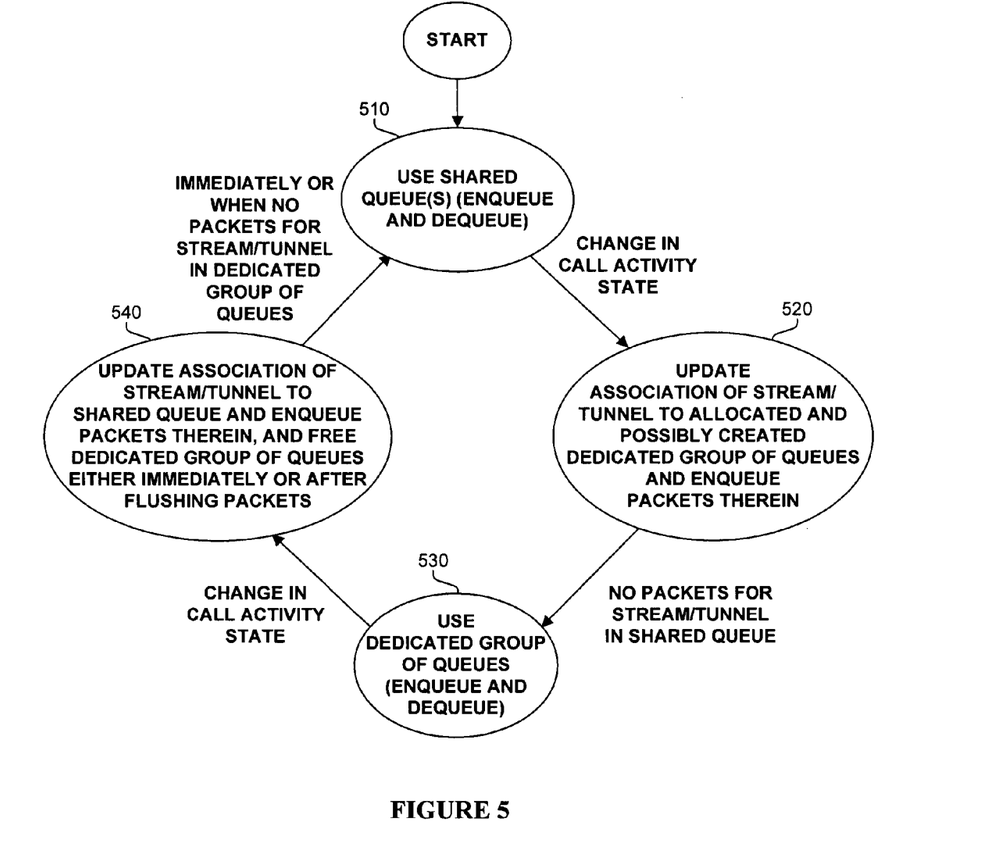
FIG. 5 is a state diagram illustrating an operation of dynamic switching between dedicated and shared queues as performed in one embodiment.

FIG. 5 is a state diagram illustrating an operation of dynamic switching between dedicated and shared queues as performed in one embodiment for each particular tunnel/packet stream. In the initial state (510), the particular tunnel/packet stream is associated with the one or more shared queues. Upon detection of a changed in the call activity state for the particular tunnel/packet stream, its state transitions to state 520, wherein the association of the particular tunnel/packet stream is updated to reflect a dynamically allocated (possibly after creating the queue group) and assigned dedicated queue group, with packets being enqueued therein. Upon the flushing of the one or more shared queues of packets corresponding to the particular tunnel/packet stream, the state transitions to state 530, wherein packets of the particular tunnel/packet stream are enqueued to and dequeued from the assigned dedicated queue group. Upon detection of a change in call activity state, the state transitions to state 540, wherein the association of the particular tunnel/packet stream is updated to the one or more shared queues, and packets corresponding to the particular tunnel/packet stream are then enqueued in the shared queue. Either immediately or in response to the flushing of the dedicated queue group, the shared queue is used for both enqueuing and dequeuing packet associated with the particular tunnel/packet stream, and the previously associated dedicated queue group is freed for use by another tunnel/packet stream.

In one embodiment, depending on the type of traffic being sent by the particular tunnel/packet stream, some portion of its traffic such as control traffic might always use the one or more shared queues, and data or other traffic would obey the rules described with respect to FIGS. 4-5. This is possible when packet ordering of a subset of the traffic, such as keep-alives, is not required to be kept in-order with other traffic.

In one embodiment, it is possible that the dedicated queues are actually themselves shared. Associated traffic, such as traffic originating on the same physical link and of the same class of service, could potentially share the same dedicated queues with other similar traffic from different tunnels.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
    dynamically switching queues associated with packet streams by a device;
    wherein the device includes: a shared queue group of one or more shared queues and a plurality of groups of dedicated queues of one or more dedicated queues; wherein the shared queue group and the plurality of groups of dedicated queues are in parallel sharing a common input location and sharing a common output location; and
    wherein said dynamically switching queues includes:
        associating a plurality of packet streams with the shared queue group, such that: all packet traffic received over each packet stream of the plurality of packet streams, including a particular packet stream, is enqueued into the shared queue group, and each packet stream is not associated with any of said groups of dedicated queues;
        subsequent to said association of the particular packet stream with the shared group queue and at least one non-control data packet of the particular packet stream is said enqueued into the shared queue group: detecting a change in the packet activity status of packet traffic over the particular packet stream;
        in response to said detected change in the packet activity status of packet traffic over the particular packet stream of said packet streams: identifying a currently free particular group of dedicated queues of said groups of dedicated queues, and associating the particular packet stream with the particular group of dedicated queues such that at least non-control data traffic received over the particular packet stream is subsequently enqueued into the particular group of dedicated queues while the particular packet stream remains associated with the particular group of dedicated queues; and
        removing and processing or forwarding said received packets from said shared queue group and the particular group of dedicated queues;
        wherein each packet of the particular packet stream is stored in either, but not both, of the particular group of dedicated queues and the shared queue group; and
        wherein packets of a packet stream of the plurality of packet streams not associated with one of said groups of dedicated queues are enqueued in the same said one or more shared queues of the shared queue group; and
        wherein packets of only a single one of the plurality of packet streams are enqueued into a currently used group of said groups of dedicated queues.

2. The method of claim 1, including:
    detecting a second detected change in the packet activity subsequent to said association of the particular packet stream with the particular group of dedicated queues and at least one of the particular packet stream was said enqueued into the particular group of dedicated queues; and
    in response to said detecting the second detected change: removing the association of the particular packet stream with the particular group of dedicated queues such that packet traffic received over the particular packet stream is subsequently enqueued into the shared queue group until another detected change in the packet activity status of packet traffic of the particular packet stream is detected, and that the particular group of dedicated queues is freed for use by another packet stream of the plurality of packet streams.

3. The method of claim 2, wherein the detected change corresponds to the commencement of a voice call; and the second detected change corresponds to the end of the voice call.

4. The method of claim 2, wherein the detected change corresponds to the commencement of a data call; and the second detected change corresponds to the end of the data call.

5. The method of claim 2, wherein said at least non-control data traffic received over the particular packet stream includes all traffic received over the particular packet stream.

6. The method of claim 5, wherein at least one packet received over the particular packet stream resides in the shared queue subsequent to said association of the particular packet stream with the particular group of dedicated queues and prior to said removing the association of the particular packet stream with the particular group of dedicated queues; and wherein said removing and processing or forwarding of said received packets includes: subsequent to said association of the particular packet stream with the particular group of dedicated queues and prior to said removing the association of the particular packet stream with the particular group of dedicated queues, ensuring all packets received from over the particular packet stream are removed from the shared queue group prior to removing said received packets received over the particular packet stream from the particular group of dedicated queues.

7. The method of claim 2, wherein each of said packet streams corresponds to a different packet tunnel.

8. The method of claim 2, wherein said detected change in the packet activity status corresponds to a change in a type of traffic to be associated with a quality of service specific to the particular packet stream.

9. The method of claim 8, wherein said type of traffic to be associated with quality of service specific to the particular packet stream includes an active voice call.

10. The method of claim 8, wherein said type of traffic to be associated with quality of service specific to the particular packet stream includes an active data call.

11. The method of claim 1, wherein the number of packet streams in the plurality of packet streams is greater than the number of groups in the plurality of groups of dedicated queues.

12. The method of claim 11, wherein the number of packet streams in the plurality of packet streams is greater than the number of groups in the plurality of groups of dedicated queues by at least an order of magnitude.

13. The method of claim 1, wherein each of said groups of the plurality of groups of dedicated queues includes at least two queues.

14. The method of claim 1, wherein the plurality of packet streams includes at least three packet streams.

15. The method of claim 1, wherein said shared queue group includes at least two shared queues.

16. The method of claim 1, wherein said shared queue group includes at most one shared queue.

17. The method of claim 1, wherein the detected change is identified based on an inspection of a particular packet or a particular sequence of packets received on the particular packet stream.

18. The method of claim 1, wherein the detected change is identified based on one or more received packets containing call control information for initializing a voice or data call over the particular packet stream.

19. The method of claim 1, wherein the detected change is identified based on an increased rate of traffic received over the particular packet stream.

20. The method of claim 1, wherein each of the packet streams is associated with a level of service of a plurality of levels of service and each of the plurality of groups of dedicated queues is associated with a level of service of a plurality of levels of service, and wherein the method includes selecting the particular group of dedicated queues from the plurality of groups of dedicated queues in order to match its said level of service with said level of service of the particular packet stream.

21. The method of claim 1, wherein no packets containing data of a voice or data call are enqueued into a shared queue of the group of shared queues.

22. The method of claim 1, wherein each of said packet streams corresponds to a packet tunnel.

23. The method of claim 22, wherein said change in the packet activity is a change in a characterization of the type of traffic currently being received over the particular packet stream from a mode to keep said tunnel associated with the packet stream active to a mode of increased voice or data traffic over the particular packet stream.

24. The method of claim 23, further comprising the limitation of: in response to a second detected change in the packet activity subsequent to said association of the particular packet stream with the particular group of dedicated queues, removing the association of the particular packet stream with the particular group of dedicated queues such that packet traffic received over the particular packet stream is subsequently enqueued into a shared queue of the shared queue group until another detected change in the packet activity status of packet traffic of the particular packet stream is detected, and that the particular group of dedicated queues is freed for use by another packet stream of the plurality of packet streams; wherein said second detected change in the packet activity is a change in a characterization of the type of traffic currently being received over said tunnel associated with the particular packet stream from a mode of communicating voice or data traffic to a keep said tunnel associated with the packet stream active.

25. The method of claim 22, wherein each of the plurality of plurality of packet streams use said shared queue group of shared queues to maintain tunnels associated with said packet streams or associations between end devices with one or more call servers; and wherein the number of packet streams in the plurality of packet streams is greater than the number of groups in the plurality of groups of dedicated queues.

26. The method of claim 1, wherein the particular packet stream includes a first sub-stream of packets and a second sub-stream of packets, and the particular group of dedicated queues includes a first dedicated queue and a second dedicated queue; and wherein the first sub-stream is enqueued into the first dedicated queue and the second sub-stream is enqueued into the second dedicated queue.

27. The method of claim 26, wherein the first dedicated queue is serviced at a higher priority servicing rate than the second dedicated queue.

28. The method of claim 26, wherein said forwarding of said received packets from said shared queue group and the particular group of dedicated queues includes forwarding packets from both said shared queue group and the particular group of dedicated queues over a same communications connection or packet tunnel.

29. The method of claim 1, wherein said operation of identifying the currently free particular group of dedicated queues of said groups of dedicated queues includes allocating the currently free particular group of dedicated queues from one or more currently free groups of dedicated queues in said groups of dedicated queues.

30. The method of claim 1, wherein said operation of identifying the currently free particular group of dedicated queues of said groups of dedicated queues includes creating a new group of dedicated queues in said groups of dedicated queues, with the new group being the currently free particular group of dedicated queues.

31. A method, comprising:
dynamically switching queues associated with packet tunnels by a device;
wherein the device includes: one or more shared queues and a plurality of groups of dedicated queues; wherein said one or more shared queues and the plurality of groups of dedicated queues are in parallel sharing a common input location and sharing a common output location;
wherein said dynamically switching queues includes:
associating a plurality of packet tunnels with said one or more shared queues such that: all packet traffic sent over each packet tunnel of the plurality of packet tunnels, including a particular packet tunnel, is enqueued to said one or more shared queues, and each packet tunnel is not associated with any of the dedicated queues;
subsequent to said association of the particular packet tunnel with said shared queues and at least one non-control data packet of the particular packet tunnel is said enqueued into a shared queue of said shared queues: detecting a change in the packet activity status of packet traffic over the particular packet tunnel of said packet streams;
in response to said detected change in the packet activity status of packet traffic to be sent over a particular packet tunnel of said packet tunnels: identifying a currently free particular group of dedicated queues of said groups of dedicated queues, and associating the particular packet tunnel with the particular group of dedicated queues such that at least non-control data traffic received over the particular tunnel is enqueued to the particular group of dedicated queues while the particular packet tunnel remains associated with the particular group of dedicated queues; and
removing and processing or forwarding packets from said shared and dedicated queues;
wherein each packet of the particular packet tunnel is stored in either, but not both, of the particular group of dedicated queues and one of said shared queues; and wherein packets of a packet tunnel of the plurality of packet tunnels not associated with one of the plurality of groups of dedicated queues are enqueued in the same said one or more shared queues; and wherein packets of only a single one of the plurality of packet tunnels are enqueued into a currently used group of the plurality of groups of dedicated queues.

32. The method of claim 31, including:
detecting a second detected change in the packet activity subsequent to said association of the particular packet tunnel with the particular group of dedicated queues and at least one of the particular packet stream was said enqueued into the particular group of dedicated queues; and
in response to said detecting the second detected change: removing the association of the particular packet tunnel with the particular group of dedicated queues such that packet traffic received over the particular tunnel is enqueued to said one or more shared queues until another detected change in the packet activity status of packet traffic of the particular packet tunnel is detected, and that the particular group of dedicated queues is freed for use by another packet tunnel of the plurality of packet tunnels.

33. The method of claim 32, wherein the detected change corresponds to the commencement of a voice call; and the second detected change corresponds to the end of the voice call.

34. The method of claim 32, wherein the detected change corresponds to the commencement of a data call; and the second detected change corresponds to the end of the data call.

35. An apparatus, comprising:
a group of one or more shared queues in parallel sharing a common input location and sharing a common output location with a plurality of groups of one or more dedicated queues;
memory; and
one or more processing elements configured: to maintain associations of a plurality of packet streams with groups of said shared and dedicated queues, to detect changes in packet activity status in packet streams of the plurality of packet streams, and to update said associations of packet streams with said groups of said shared and dedicated queues such that packet streams with a packet activity status of being in a maintenance mode are associated with, causing the use of, the group of shared queues, while packet streams with a packet activity status of a high-level of activity mode are associated with, causing the use of, groups of the plurality of groups of dedicated queues; wherein said updating said associations of packet streams with said groups of said shared and dedicated queues includes: freeing a specific group of dedicated queues of said groups of dedicated queues for use by a different packet stream when switching a specific packet stream from using the specific group of dedicated queues to the group of said shared queues; and wherein said updating said associations of packet streams with said groups of said shared and dedicated queues includes switching an identified packet stream from using the group of said shared queues to an identified currently free group of said groups of dedicated queues;
wherein the apparatus is configured to receive packets of said packet streams and to enqueue said packets in said groups of said shared and dedicated queues according to said associations of packet streams with said groups of said shared and dedicated queues; and
wherein the apparatus is configured to dequeue packets from said shared and dedicated queues and to forward or process said dequeued packets;
wherein the apparatus is configured to switch a particular packet stream of the plurality of packet streams from having its packets enqueued in the group of shared queues to having its of packets enqueued in a group of the plurality of groups of dedicated queues in response to said detected change in the packet activity status of the particular packet stream from the maintenance mode to the high-level of activity mode;
wherein the apparatus is configured to store each packet of the particular packet stream in either, but not both, of the group of shared queues and the plurality of groups of dedicated queues; and
wherein the apparatus is configured to enqueue packets of a packet stream of the plurality of packet streams not associated with one of the plurality of groups of dedicated queues in the same said one or more shared queues; and
wherein the apparatus is configured to enqueue packets of only a single one of the plurality of packet streams into a currently used group of the plurality of groups of dedicated queues.

36. The apparatus of claim 35, wherein the number of packet streams is larger than the number of groups in the set comprising the group of shared queues and the plurality of groups of dedicated queues.

37. The apparatus of claim 36, wherein the number of packet streams is at least an order of magnitude larger than the number of groups in the set comprising the group of shared queues and the plurality of groups of dedicated queues.

38. The apparatus of claim 35, wherein said packet streams are between user devices and one or more voice call servers.

39. The apparatus of claim 38, wherein the high-level of activity mode corresponds to a voice call being conducted between a user device of said user devices and a voice call server of said voice call servers.

40. The apparatus of claim 35, wherein each of said packet streams corresponds to a different packet tunnel.

41. The apparatus of claim 35, wherein said configuration of said one or more processing elements includes switching the particular packet stream from having its packets enqueued in the group of the plurality of groups of dedicated queues to having its of packets enqueued in the group of shared queues in response to said detected change in the packet activity status of the particular packet stream from the high-level of activity mode to the maintenance mode.

42. A device, comprising:
packet queues including: a group of one or more shared queues in parallel sharing a common input location and sharing a common output location with a plurality of groups of one or more dedicated queues; wherein each packet stored in said packet queues is stored in only a single queue of said shared queues and said dedicated queues;
memory; and
one or more processing elements configured to maintain associations of a plurality of packet streams with groups of said shared and dedicated queues, and to detect changes in packet activity status in packet streams of the plurality of packet streams and to update said associations of packet streams with said groups of said shared and dedicated queues such that packet streams with a lower amount of packet activity status are associated with, causing the use of, the group of shared queues, while packet streams with a packet activity status of a high-level of activity mode are associated with, causing the use of, groups of the plurality of groups of dedicated queues; wherein said updating said associations of packet streams with said groups of said shared and dedicated queues includes: freeing a specific group of dedicated queues of said groups of dedicated queues for use by a different packet stream when switching a specific packet stream from using the specific group of dedicated queues to the group of said shared queues; and wherein said updating said associations of packet streams with said groups of said shared and dedicated queues includes switching an identified packet stream from using the group of said shared queues to an identified currently free group of said groups of dedicated queues;

wherein the device is configured to enqueue received packets of said packet streams in said groups of said shared and dedicated queues according to said associations of packet streams with said groups of said shared and dedicated queues;

wherein the device is configured to dequeue packets from said shared and dedicated queues and to forward or process said dequeued packets;

wherein the device is configured to enqueue packets of a packet stream of the plurality of packet streams not associated with one of the plurality of groups of one or more dedicated queues in the same said one or more shared queues; and wherein the device is configured to enqueue packets of only a single one of the plurality of packet streams into a currently used group of the plurality of groups of one or more dedicated queues.

43. The device of claim 42, wherein the number of packet streams is larger than the number of groups in the set comprising the group of shared queues and the plurality of groups of dedicated queues.

44. The device of claim 42, wherein each of said packet streams corresponds to a different packet tunnel.

45. A queue block, comprising:
a shared group of queues in parallel sharing a common input location and sharing a common output location with one or more dedicated groups of queues configured for queuing packet streams within the queue block;
wherein a group of queues is defined to include one or more queues;
wherein packets of a plurality of packet streams that are received by the queue block are stored in a single queue of a single queue group, with the single queue group consisting of: the shared group of queues and said one or more dedicated groups of queues;
wherein packets of a packet stream of the plurality of packet streams not associated with one of said one or more dedicated groups of queues are enqueued in the same said one or more queues of said shared group of queues; and wherein packets of only a single one of the plurality of packet streams are enqueued into a currently used group of one or more dedicated groups of queues; and
wherein packets of each particular packet stream of the plurality of packet streams are enqueued into the shared group of queues until a detected change of state or increased activity causing the particular packet stream to become associated with a currently unused particular dedicated group of queues of said one or more dedicated groups of queues resulting in packets of said particular packet stream to be enqueued into said particular dedicated group of queues.

46. The queue block of claim 43, wherein packets of an identifiable packet stream of the plurality of packet streams currently associated with an identifiable dedicated group of queues of said one or more dedicated groups of queues are enqueued into the identifiable dedicated group of queues until a detected change of state or decreased activity causing the identifiable packet stream to become unassociated with the identifiable dedicated group of queues resulting in packets of the identifiable packet stream to be enqueued into the same said one or more queues of said shared group of queues.

47. A method, comprising:
queuing packet streams, by a device, at a location within the device, wherein said queuing of said packet streams includes dynamically switching queues associated with packet streams by a device;
wherein the device includes: a shared group of queues in parallel sharing a common input location and sharing a common output location with one or more dedicated groups of queues configured for said queuing packet streams; wherein a group of queues is defined to include one or more queues;
wherein said dynamically switching queues includes storing, in a single queue of a single queue group, packets of a plurality of packet streams that are received by the queue block, with the single queue group consisting of: the shared group of queues and said one or more dedicated groups of queues;
wherein packets of a packet stream of the plurality of packet streams not associated with one of said one or more dedicated groups of queues are enqueued in the same said one or more queues of said shared group of queues; and wherein packets of only a single one of the plurality of packet streams are enqueued into a currently used group of one or more dedicated groups of queues; and
wherein packets of each particular packet stream of the plurality of packet streams are enqueued into the shared group of queues until a detected change of state or increased activity causing the particular packet stream to become associated with a currently unused particular dedicated group of queues of said one or more dedicated groups of queues resulting in packets of said particular packet stream to be enqueued into said particular dedicated group of queues.

48. The method of claim 47, wherein packets of an identifiable packet stream of the plurality of packet streams currently associated with an identifiable dedicated group of queues of said one or more dedicated groups of queues are enqueued into the identifiable dedicated group of queues until a detected change of state or decreased activity causing the identifiable packet stream to become unassociated with the identifiable dedicated group of queues resulting in packets of the identifiable packet stream to be enqueued into the same said one or more queues of said shared group of queues.

* * * * *

UNITED STATES PATENT AND TRADEMARK OFFICE
CERTIFICATE OF CORRECTION

| | | |
|---|---|---|
| PATENT NO. | : 8,149,708 B2 | Page 1 of 1 |
| APPLICATION NO. | : 11/407805 | |
| DATED | : April 3, 2012 | |
| INVENTOR(S) | : Oz et al. | |

It is certified that error appears in the above-identified patent and that said Letters Patent is hereby corrected as shown below:

Col. 20, Claim 46, line 5, replace "claim 43," with -- claim 45, --

Signed and Sealed this
Nineteenth Day of June, 2012

David J. Kappos
*Director of the United States Patent and Trademark Office*